Aug. 28, 1951          J. S. MACKAY          2,566,229
                METHOD OF DISCHARGING MELAMINE
Filed Dec. 4, 1950                        2 Sheets-Sheet 1
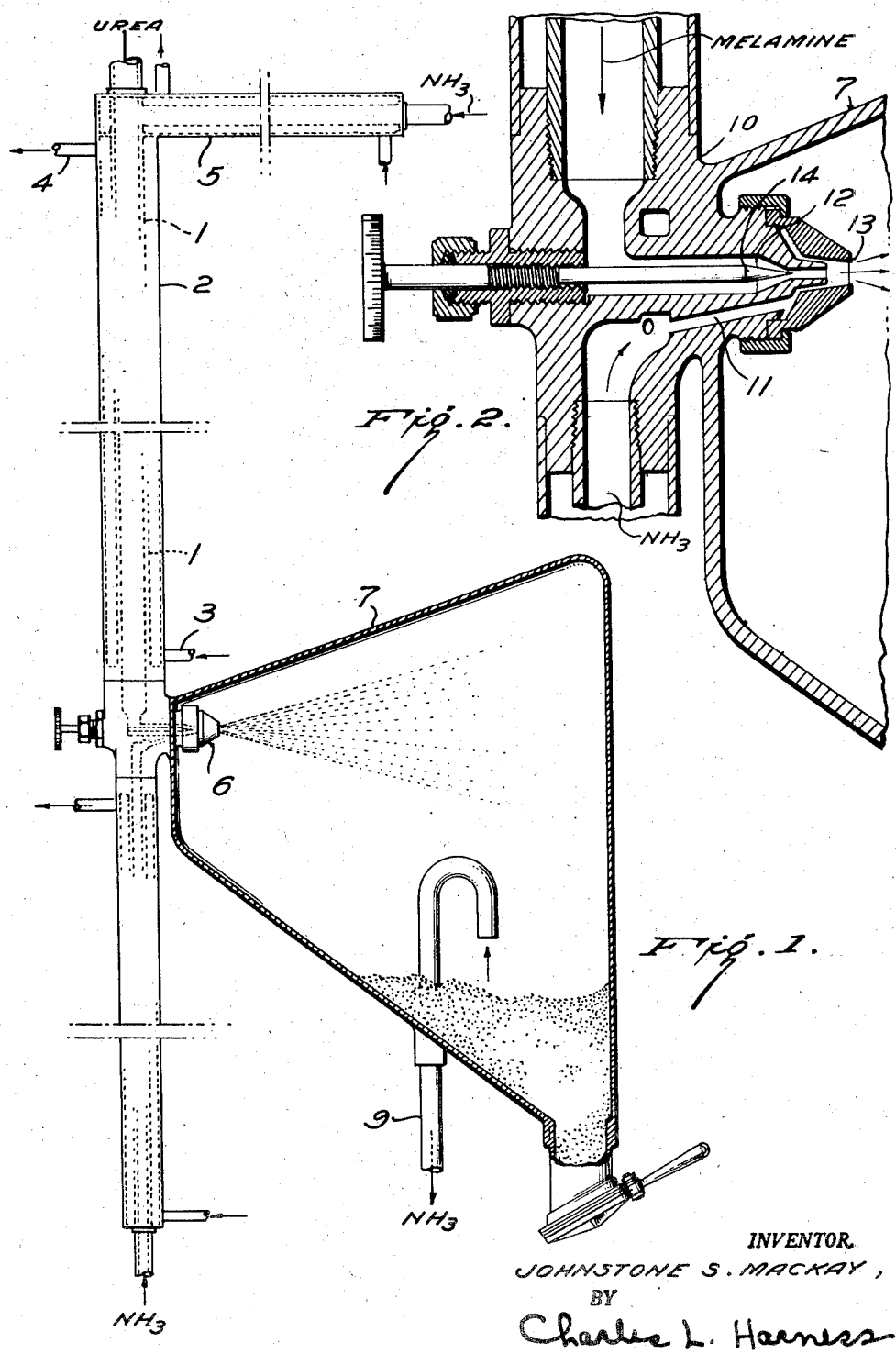
INVENTOR.
JOHNSTONE S. MACKAY,
BY
Charles L. Harness
ATTORNEY

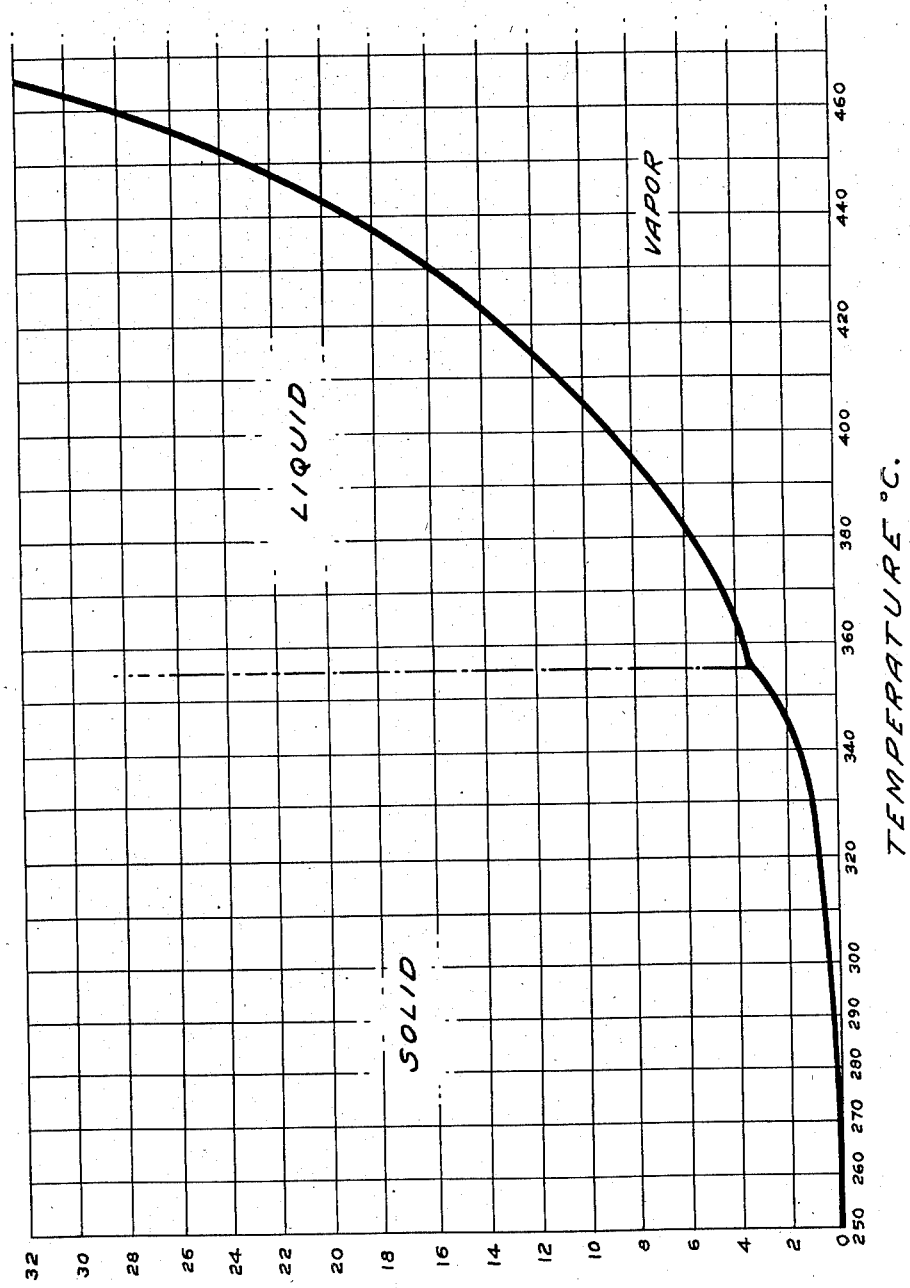

Patented Aug. 28, 1951

2,566,229

UNITED STATES PATENT OFFICE 2,566,229

METHOD OF DISCHARGING MELAMINE

Johnstone S. Mackay, Old Greenwich, Conn., assignor to American Cyanamid Company, New York, N. Y., a corporation of Maine Application December 4, 1950, Serial No. 199,021

3 Claims. (Cl. 159—48)

The present invention relates to an improvement in the production of melamine by processes involving high pressures and temperatures, and in particular, to a method for the removal of melamine from such high pressure and temperature systems.

This is a continuation-in-part of applicant's copending Serial No. 63,025, filed December 2, 1948, now abandoned.

An object of the present invention is to remove molten melamine from high pressure melamine-forming apparatus with little or no decomposition of said melamine. Another object is to discharge molten melamine from a superatmospheric pressure zone into a zone maintained at approximately atmospheric pressure with little or no decomposition of the melamine. A further object is to discharge molten melamine from a superatmospheric pressure zone into a zone of approximately atmospheric pressure by atomizing said melamine in contact with sufficient gas to vaporize the melamine, and recover solid melamine by chilling the gases.

Other objects of the present invention will be made apparent from the discussion hereinafter.

The methods currently employed in the commercial production of melamine involve the use of high pressures and elevated temperatures because the materials most suitable for making melamine such as dicyandiamide, urea, guanidine, biguanides, biuret, cyanourea, and the like, are best converted to melamine under conditions of elevated temperatures and pressures. However, difficulty has been experienced in removing the molten melamine produced under such conditions of high temperature and pressure owing to the tendency of melamine to decompose into ammonia, melam, melem, and melon when exposed to normal atmospheric conditions. Decomposition may be avoided by using a batch process and permitting the liquid melamine to solidify, but an equal or greater disadvantage is encountered in the tendency of solid melamine to clog the reaction apparatus, from which it must be removed with a pick axe or similar drastic means. Attempts have also been made to discharge the melamine at temperatures lower than its melting point of 354° C. by employing suitable solvents, but these means have not been satisfactory because melamine is not sufficiently soluble for this purpose except in the lower-boiling alcohols, and these solvents tend to flash off at the pressure reducing valve, causing the melamine to precipitate and clog the valves and conduits of the apparatus.

It has now been found that liquid melamine can be removed successfully from a high pressure and temperature system without decomposition if the melamine is immediately volatilized at the point where it encounters atmospheric pressure and caused to solidify without repassing through the liquid phase. An effective means of accomplishing such volatilization is to atomize the liquid melamine by means of a spray device just inside the delivery port, and simultaneously to contact the atomized melamine with a gas inert to it such as ammonia, nitrogen, or the like. Enough contacting gas must be used to evaporate the melamine quickly. As may be expected, raising the temperature of the contacting gas decreases the amount of gas necessary. When the melamine is completely vaporized, its rate of decomposition is very much lower than that of liquid melamine, and virtually no decomposition occurs during the period necessary to cool the mixed vapors sufficiently for melamine to precipitate from the vapor phase directly to the solid phase.

The invention may be more readily understood and described by referring to the drawings. In the drawings:

Fig. 1 is a side elevation, partly in section, of apparatus for forming, discharging, and collecting melamine.

Fig. 2 is a side elevation partly in section showing the atomizer in more detail.

Fig. 3 is a phase diagram of melamine as determined from the best available data.

The following example illustrates without limiting the invention.

Example

Referring particularly to Fig. 1, a high temperature and pressure melamine-forming zone 1 is shown surrounded for a substantial part of its length with a heating jacket 2, having ports 3 and 4 for the admission and venting of a heating medium such as steam or the like. Within this zone melamine can be formed by any of the known high temperature, high pressure methods and from any melamine-forming material, most of which have already been listed. There are many high temperature, high pressure methods old in the art using a variety of raw materials, but only one is described here for the purpose of demonstrating the invention, namely, the preparation of melamine from urea. Numerous other processes will occur to those skilled in the art.

Molten urea is passed into zone 1 under a pressure of about 1250 lb./sq.in. and at a temperature of about 450 C. Ammonia at the same temperature and pressure, heated by heating jacket 5, is passed into the reaction zone 1, whereby liquid melamine is obtained in good yield.

This melamine accumulates in a pool at the bottom of reaction zone 1 and is sprayed at the rate of 100 g./hr. through atomizer 6 into collector 7, which can be a chamber cooled simply by exposure to the temperature of the surrounding air, or by any other well-known means. Ammonia is withdrawn through outlet 9 of the collector. Outlet 9 is connected with any suitable filter (not shown), such as a bag filter, to remove melamine dust from the outgoing ammonia. Numerous equivalent means of dust removal will occur to those skilled in the art.

Fig. 2 shows the atomizer in more detail. Housing 10 is the lower part of the reaction zone 1, wherein molten melamine collects after it has been formed. Ammonia at about 450° C. is introduced into orifice 11 at a rate of 300 g./hr. The molten melamine still at 450° C. is forced through port 12, is turbulently and intimately intermixed with the ammonia, and is thereby not only atomized but also almost completely vaporized before it passes through orifice 13 into the collecting portion of the apparatus. Obviously, the faster the atomized melamine is vaporized, the less opportunity it will have to decompose. It is advantageous, therefore, to create the greatest possible droplet surface, and this can be done by adjusting the atomizer needle 14 to give the finest possible spray. The needle can be lowered so as to seat in orifice 12, effectively sealing zone 1 from the collecting unit. During the initial stages of melamine formation it may be necessary to close the melamine-forming zone until a sufficient amount of liquid melamine accumulates in the bottom of the zone.

The rate of ammonia discharge through the jet 11 is critical and depends on the rate at which the molten melamine is discharged through port 12. At least ½ g. (preferably 3–6 g.) of ammonia must be discharged along with every gram of molten melamine to attain the main object of this invention, which is to solidify melamine vapor without repassing through the unstable liquid phase. The ratio of at least ½ g. of ammonia:1 g. of melamine corresponds to a respective mole ratio of at least 3.5:1. When a diluent gas other than ammonia is used the weight ratio may be different, depending on the molecular weight of the gas, but the mole ratio will always be at least 3.5:1.

While the inventor does not wish to be bound by theory, it is his belief that the ratio of at least 3.5:1 is critical for the following reasons. As shown by Figure 3, melamine vapor can be cooled directly to solid melamine without passing through the liquid phase only if its vapor pressure is less than 3.3 p. s. i. (melamine triple point). It will also be evident that pure melamine vapor at temperatures in excess of 354° C. (melamine melting point) has a vapor pressure in excess of 3.3 p. s. i., and that if such vapor is cooled to room temperature it will pass through the unstable liquid phase before solidifying. However, by admixing at least 3.5 moles of an inert gas such as ammonia with each mole of melamine vapor and then allowing the mixed gases to expand into a container at approximately room temperature and atmospheric pressure, the resultant partial pressure of the melamine vapor is reduced so that it falls just short of the 3.3 p. s. i. that would liquefy some of it. Thus at atmospheric pressure (14.7 p. s. i.) this would require the partial pressure of the diluent gas to be 14.7—3.3 or 11.4 p. s. i., or a ratio by volume or by moles of at least 11.4:3.3, or about 3.5:1.

It is consequently immaterial at what temperature and pressure the molten melamine is discharged from the reactor, provided that the accompanying inert gas is supplied at the rate of at least 3.5 moles/mole of molten melamine. A higher ratio is preferred, however, in order to atomize and vaporize the molten melamine more efficiently. The ratio can even be 100:1 or more, but the cost of recovering the diluent gas exceeds the slightly increased benefits of such great dilutions.

In the above example the diluent ammonia was added through orifice 11 at the same temperature as the molten melamine, but this is not necessary, and in some instances will even be undesirable. The initial temperature of the ammonia or other diluent gas is governed by the amount of heat available to the system. In addition to requiring 3.5 moles of diluent gas/mole melamine, there is the further requirement that the gas-melamine mixture be hot enough to supply the heat of vaporization necessary to convert molten melamine to melamine vapor. The heat of vaporization of melamine is about 18,000 calories/mole, or 143 calories/gm. Thus if 1 g. of molten melamine is to be vaporized at its melting point of 354° C. by ½ g. of ammonia (which is the minimum ammonia:melamine ratio possible in operating this invention) that ½ g. of ammonia would have to be hot enough to give up 143 calories to the system. Now the specific heat of ammonia at melamine-forming temperatures is about 0.7 cal./°C./g. Thus ½ g. of hot ammonia would contribute about 0.35 calorie per °C. temperature drop, and the total drop is thus 143÷0.35 or 410° C. So, when using the minimum amount of ammonia with melamine at the lowest temperature at which it is still molten, it is seen that the ammonia must be added to the melamine at a temperature of at least 354°+ 410°, or 764° C. In similar fashion the diluent injection temperature can be calculated for vaporizing melamine having temperatures higher than 354° C., or when using amounts of diluent greater than the 3.5:1 minimum, or when using diluents other than ammonia. It is thus seen that the diluent injection temperature is preferably 375–600° C., and never below 354° C. Obviously the greater the amount of diluent or the hotter the melamine, the lower the initial temperature of the diluent can be.

In the above example the use of ammonia as the diluting gas has been described. This gas is preferable to other inert gases since it tends to reconvert the decomposition products of melamine, such as melam, melem, and melon, to the original melamine. However, nitrogen or any other gas inert to melamine can be used equally well in order to maintain the melamine in the vapor phase.

While the present invention has been described with particular reference to specific embodiments thereof, it is not to be considered as limited thereby, but is to be construed solely in the light of the appended claims.

I claim:

1. The method of discharging liquid melamine from a super-atmospheric pressure zone into a zone of approximately atmospheric pressure which comprises forcing said melamine from the first-named zone into the second, vaporizing the thus discharged molten melamine by contacting the same in the said second zone with a gas from an exterior source, said gas being inert to melamine in a gas:melamine mole ratio of at least 3.5:1, said gas having an initial temperature of at least 354° C., and cooling the mixed vapors to solidify the melamine.

2. The method of claim 1 in which the inert gas is ammonia.

3. The method according to claim 2 in which the ammonia:melamine mole ratio is 6–12:1 and the molten melamine is discharged at about 450° C.

JOHNSTONE S. MACKAY.

REFERENCES CITED

The following references are of record in the file of this patent:

UNITED STATES PATENTS

| Number | Name | Date |
|---|---|---|
| 1,308,403 | Doonar | July 1, 1919 |
| 1,673,685 | Johnston et al. | June 12, 1928 |
| 2,164,705 | Fisch | July 4, 1939 |
| 2,340,903 | Shepard | Feb. 8, 1944 |

FOREIGN PATENTS

| Number | Country | Date |
|---|---|---|
| 933,241 | France | Dec. 17, 1947 |